(12) United States Patent
Zhang (10) Patent No.: US 11,210,003 B2
(45) Date of Patent: Dec. 28, 2021

(54) METHOD, DEVICE AND COMPUTER PROGRAM PRODUCT FOR RESTORING DATA BASED ON REPLACING CHILD NODE IDENTIFIERS WITH PARENT NODE IDENTIFIER

(71) Applicant: EMC IP Holding Company LLC, Hopkinton, MA (US)

(72) Inventor: Zhibin Zhang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 189 days.

(21) Appl. No.: 16/558,098

(22) Filed: Aug. 31, 2019

(65) Prior Publication Data
US 2020/0341674 A1 Oct. 29, 2020

(30) Foreign Application Priority Data
Apr. 26, 2019 (CN) .......................... 201910345777.4

(51) Int. Cl.
*G06F 3/06* (2006.01)

(52) U.S. Cl.
CPC ............ *G06F 3/064* (2013.01); *G06F 3/0611* (2013.01); *G06F 3/0613* (2013.01); *G06F 3/0683* (2013.01)

(58) Field of Classification Search
CPC ...... G06F 3/064; G06F 3/0683; G06F 3/0613; G06F 11/1402
See application file for complete search history.

(56) References Cited

U.S. PATENT DOCUMENTS

2013/0246347 A1* 9/2013 Sorenson ................. G06F 16/16
707/609
2017/0300390 A1* 10/2017 Dornemann .......... G06F 16/275

OTHER PUBLICATIONS

Stager et al., "Network Data Management Protocol", Network Data Management Protocol, Feb. 2000 (124 pages).

* cited by examiner

*Primary Examiner* — Chie Yew
(74) *Attorney, Agent, or Firm* — Chamberlain, Hrdlicka, White, Williams & Aughtry (57) ABSTRACT

Embodiments of the present disclosure relates to restoring data. The embodiments comprise obtaining an index related to a group of data blocks, determining a node identifier set of a plurality of nodes in the index corresponding to a plurality of data blocks to be restored, determining, based on the index and the node identifier set, whether a first group of child node identifiers in the node identifier set related to a first group of child nodes of the plurality of nodes is to be replaced with a father node identifier of a father node of the first group of child nodes, and in response to replacing the first group of child node identifiers with the father node identifier, sending, to the backup server, a request for obtaining the plurality of data blocks to obtain the plurality of data blocks from the backup server, the request comprising the father node identifier.

6 Claims, 7 Drawing Sheets

METHOD, DEVICE AND COMPUTER PROGRAM PRODUCT FOR RESTORING DATA BASED ON REPLACING CHILD NODE IDENTIFIERS WITH PARENT NODE IDENTIFIER

FIELD

Embodiments of the present disclosure generally relate to the field of data management, and more specifically, to a method, a device and a computer program product for restoring data.

BACKGROUND

With development of information technology, the amount of data needs to be stored become larger and larger. In order to store these data, a variety of large-capacity storage devices have been developed. Meanwhile, to increase storage utilization efficiency of data, designers have developed various platforms, hardware components as well as software components to accelerate processing of the data.

When being stored, data will usually be backed up to ensure security of the data. Such a data backup mode facilitates restoring lost data with backup data when part of the data is lost. However, there are still many problems to be solved during a process of data storage and restoration.

SUMMARY

Embodiments of the present disclosure provide a method, a device and a computer program product for restoring data.

According to a first aspect of the present disclosure, provided is a method of restoring data. The method comprises obtaining an index related to a group of data blocks, the index comprising multi-level nodes for obtaining the group of data blocks. The method further comprises determining a node identifier set of a plurality of nodes in the index corresponding to the plurality of data blocks to be restored, the group of data blocks comprising the plurality of data blocks. The method further comprises determining, based on the index and the node identifier set, whether a first group of child node identifiers in the node identifier set related to a first group of child nodes of the plurality of nodes is to be replaced with a father node identifier of a father node of the first group of child nodes. The method further comprises, in response to replacing the first group of child node identifiers with the father node identifier, sending, to the backup server, a request for obtaining the plurality of data blocks to obtain the plurality of data blocks from the backup server, the request comprising the father node identifier.

According to a second aspect of the present disclosure, provided is a method of restoring data. The method comprises receiving from a storage device, a request for obtaining a plurality of data blocks, the request comprising a father node identifier of a father node corresponding to a first group of child nodes of a plurality of nodes in an index, the index comprising multi-level nodes for obtaining a group of data blocks, the group of data blocks comprising the plurality of data blocks, the plurality of data blocks corresponding to the plurality of nodes in the index. The method further comprises obtaining a sub-set of data blocks related to the father node identifier based on the father node identifier, the plurality of data blocks comprising the sub-set of data blocks. The method further comprises sending the sub-set of data blocks to the storage device as a response to the request.

According to a third aspect of the present disclosure, provided is an electronic device for restoring data. The electronic device comprises: a processor; and a memory storing computer program instructions, the processor running the computer program instructions in the memory to control the electronic device to perform acts comprising: obtaining an index related to a group of data blocks, the index comprising multi-level nodes for obtaining the group of data blocks; determining a node identifier set of a plurality of nodes in the index corresponding to a plurality of data blocks to be restored, the group of data blocks comprising the plurality of data blocks; determining, based on the index and the node identifier set, whether a first group of child node identifiers in the node identifier set related to a first group of child nodes of the plurality of nodes is to be replaced with a father node identifier of a father node of the first group of child nodes; and in response to replacing the first group of child node identifiers with the father node identifier, sending, to the backup server, a request for obtaining the plurality of data blocks to obtain the plurality of data blocks from the backup server, the request comprising the father node identifier.

According to a fourth aspect of the present disclosure, provided is an electronic device for restoring data. The electronic device comprises: a processor; and a memory storing computer program instructions, the processor running the computer program instructions in the memory to control the electronic device to perform acts comprising: receiving, from a storage device, a request for obtaining a plurality of data blocks, the request comprising a father node identifier of a father node corresponding to a first group of child nodes of the plurality of nodes in an index, the index comprising multi-level nodes for obtaining a group of data blocks, the group of data blocks comprising the plurality of data blocks, the plurality of data blocks corresponding to the plurality of nodes in the index; obtaining a sub-set of data blocks related to the father node identifier based on the father node identifier, the plurality of data blocks comprising the sub-set of data blocks; and sending the sub-set of data blocks to the storage device as a response to the request.

According to a fifth aspect of the present disclosure, provided is a computer program product. The computer program product is tangibly stored on a non-transient computer readable medium and comprises machine executable instructions which, when being executed, cause a machine to perform the method according to the first aspect of the present disclosure.

According to a sixth aspect of the present disclosure, provided is a computer program product. The computer program product is tangibly stored on a non-transient computer readable medium and comprises machine executable instructions which, when being executed, cause a machine to perform the method according to the second aspect of the present disclosure.

BRIEF DESCRIPTION OF THE DRAWINGS

Through a more detailed description of example embodiments of the present disclosure with reference to accompanying drawings, the above and other objects, features and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION OF EMBODIMENTS

Embodiments of the present disclosure will be described in more detail with reference to the accompanying drawings. Although the embodiments of the present disclosure have been illustrated, it should be understood that, the present disclosure can be implemented in various manners, and thus should not be construed to be limited to the embodiments disclosed herein. Rather, those embodiments are provided for a thorough and complete understanding of the present disclosure. It should be understood the accompanying drawings and embodiments of the present disclosure are only for illustration purpose rather than limiting the protection scope of the present disclosure.

The terms "include" and its variants used here are to be read as open terms that mean "include, but is not limited to." The term "based on" is to be read as "based at least in part on". The terms "one embodiment" and "the embodiment" are to be read as "at least one embodiment." The terms "first," "second" and the like may refer to different or the same objects. Other definitions, explicit and implicit, might be included below.

Principles of the present disclosure will be described with reference to several example embodiments shown in the accompanying drawings, in which the preferable embodiments of the present disclosure have been illustrated. However, it should be understood these embodiments are described only for enabling those skilled in the art to better understand and further implement the present disclosure, rather than limiting the scope of the present disclosure in any manner.

In the field of data storage, data from a data storage device are backed up to a backend backup server. When the backend backup server receives a request for restoring data, the backup server will provide a target-based data restoration, wherein each target corresponds to one node in an index related to backup data. Such a target-based data restoring method will send one stream to each node in the index. However, when there are numbers of nodes corresponding to data to be restored, many streams will be generated for the nodes. Regarding each node, it is necessary to retrieve data of the node and validate its existence and size. Therefore, the more the nodes, the longer the time consumed. In addition, because there are a large number of streams corresponding to nodes, the backend backup server will waste resources.

Therefore, in order to at least solve the foregoing problems, the present disclosure proposes a solution for restoring data. According to various embodiments of the present disclosure, an index related to to-be-restored data blocks and node identifiers of the to-be-restored data blocks are obtained. Based on a comparison between the index and the node identifiers, a group of node identifiers of the node identifiers is replaced with a father node identifier of the group of node identifiers. By this means, the number of node identifiers related to to-be-restored data blocks and that need to be sent to the backup server can be reduced, and thus the number of streams to be received from the backup server can be reduced. With the reduction of streams, time for target validation is also reduced, and further both overhead for retrieving metadata of each node and resource consumption of the backup server are reduced.

Figure 1:
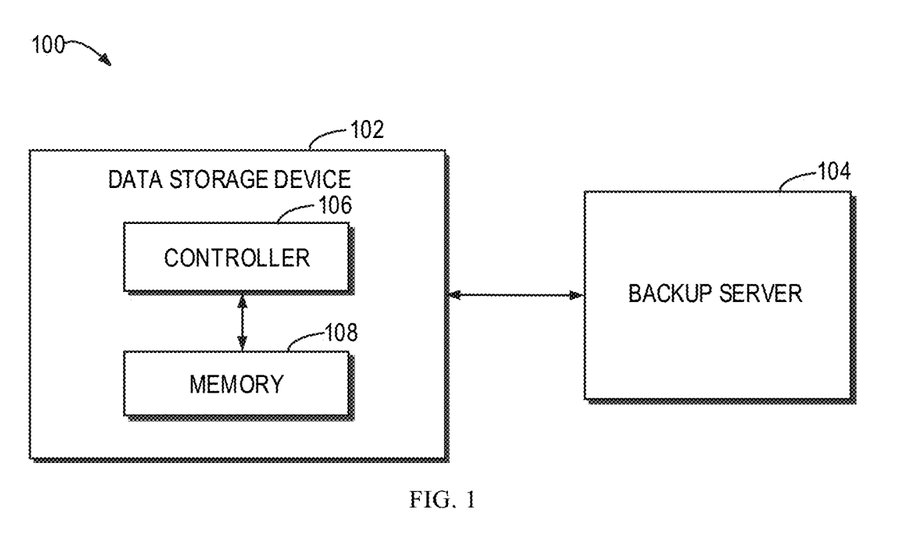
FIG. 1 shows a schematic view of an example environment 100 in which a device and/or a method according to embodiments of the present disclosure can be implemented.

FIG. 1 below shows a schematic view of an example environment 100 in which a device and/or method according to embodiments of the present disclosure.

There is a data storage device 102 in the example environment 100. The data storage device 102 is a device used to store data. For the sake of data security, the data storage device 102 needs to back up the data. In some embodiments, the data storage device 102 may be a network-attached storage NAS device. The NAS device may be connected to a network and receive a large amount of data from the network. In some embodiments, the data storage device 102 may be a direct-attached storage (DAS) device, a storage-attached network (SAN) device and other device storing and backing up data. These examples are merely for describing rather than limiting the scope of the present disclosure, and those skilled in the art may use any suitable device as the data storage device 102 based on needs.

The data storage device 102 includes a controller 106. The controller 106 is used to control the data storage device 102 to perform various operations. In some embodiments, the controller 106 may include a hardware processor, which includes but is not limited to, a hardware central processing unit (CPU), a field programmable gate array (FPGA), a complex programmable logic device (CPLD), application-specific integrated circuit (ASIC), a system on chip (SoC) or combinations thereof, etc. These examples are merely for describing rather than limiting the scope of the present disclosure. Those skilled in the art may configure the controller 106 into any suitable form based on needs.

The data storage device 102 further includes a memory 108. The memory 108 is used to store instructions and data of the data storage device 102. In some embodiments, the memory 108 may include, but not limited to, a random access memory (RAM), a read-only memory (ROM), an electrically erasable programmable read-only memory (EEPROM), a flash memory or other memory technologies, a compact disk read-only memory (CD-ROM), DVD or other optical memory, etc. These examples are merely for describing rather than limiting the scope of the present disclosure. Those skilled in the art may configure the memory 108 into any suitable form based on needs.

In a data storage system, the index is usually set to indicate a storage path of a backup data block. In some embodiments, the memory 108 may store the index related to backup data. In some embodiments, the index related to backup data may be stored in another device, e.g., a metadata server for storing metadata. These examples are merely for describing rather than limiting the scope of the present disclosure. The index related to backup data blocks may be stored in any device associated with the data storage device.

In some embodiments, a data structure of the index may be presented in a form of a tree structure. In some embodiments, the data structure of the index may be presented in a form of a linked list. In some embodiments, the index may have a root node (father node) and a leaf node. The leaf node indicates a stored data block, e.g., a file, etc.; while the father node indicates a next-level child node. These examples of the index are merely for describing rather than limiting the scope of the present disclosure, and those skilled in the art may set the index as any suitable form based on needs.

The example environment 100 further includes a backup server 104. The backup server 104 is used to store backup data blocks. The backup server 104 may include various volatile and/or non-volatile data storage media. Examples of storage media may include, but not limited to, a magnetic disk, an optical disk, a hard disk, a solid-state disk (SSD) and a cache. These examples are merely for describing rather than limiting the scope of the present disclosure. Those skilled in the art may set any suitable device as the backup server 104 based on needs.

FIG. 1 has depicted a schematic view of the example environment 100 in which a device and/or method according to embodiments of the present disclosure may be implemented. An example 200 of an index related to data blocks backed up to the backup server 104 will be described with reference to FIG. 2 as below.

Figure 2:
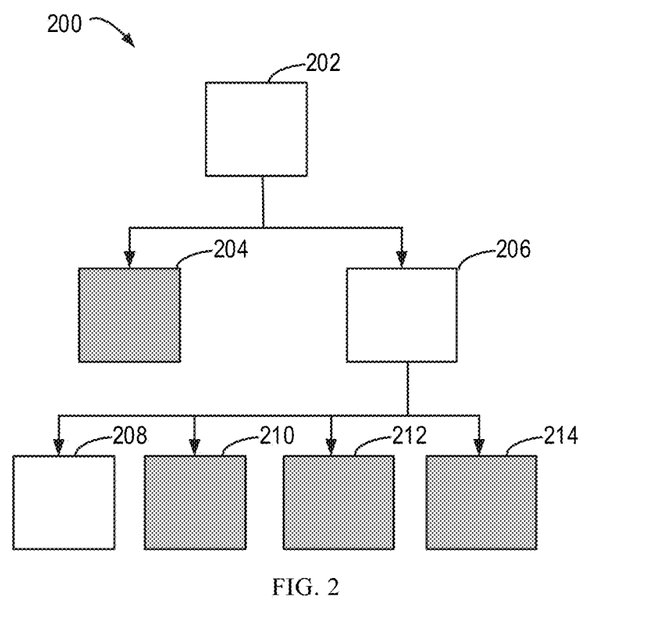
FIG. 2 shows a schematic view of an example 200 of an index related to backup data blocks according to embodiments of the present disclosure.

As shown in FIG. 2, a structure of the index 200 is, for example, a tree structure, which includes multi-level nodes. In the example 200, there are included: a first-level node: a node 202, also called root node; second-level nodes: a node 204 and a node 206, where the node 204 is a leaf node; third-level nodes: nodes 208, 210, 212 and 214, where these nodes are child nodes of the father node 206. In some embodiments, a leaf node in the index 200 stores storage addresses of some data blocks, and a father node stores a path to a child node. A corresponding backup data block may be found via a leaf node of the index. To-be-restored data blocks correspond to nodes 204, 210, 212 and 214.

The foregoing examples are merely for describing rather than limiting the scope of the present disclosure. Those skilled in the art may set the index as any suitable form.

FIG. 2 has depicted a schematic view of the example 200 of an index related to backup data blocks according to embodiments of the present disclosure. A flowchart of a method 300 of restoring data according to embodiments of the present disclosure will be described with reference to FIG. 3 as below.

Figure 3:
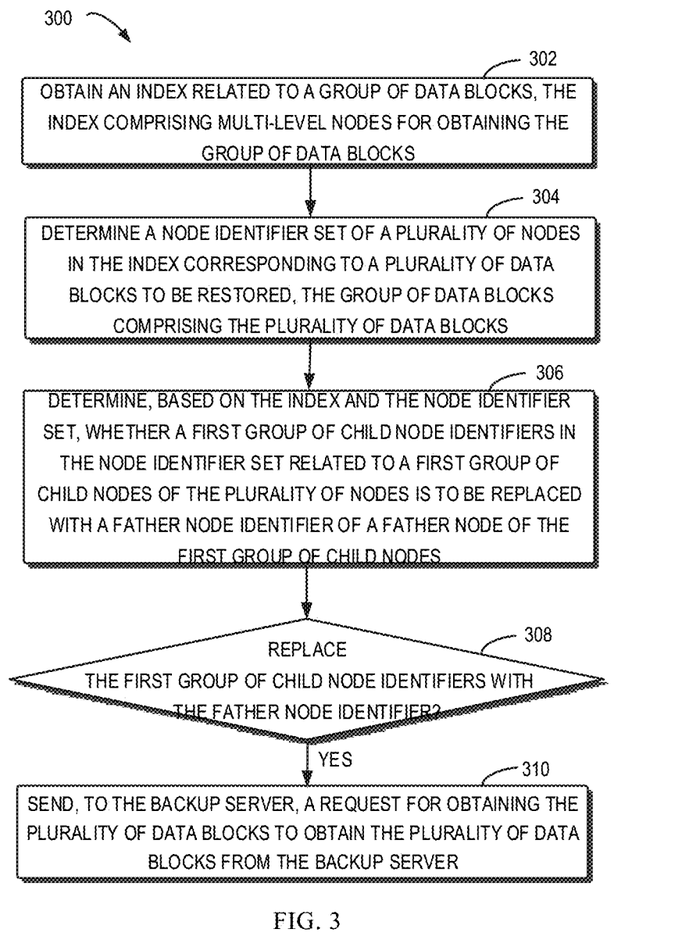
FIG. 3 shows a flowchart of a method 300 of restoring data according to embodiments of the present disclosure.

As shown in FIG. 3, the data storage device 102 may determine data content which a user needs to restore. Based on a restoration operation request of the user or a data restoration operation initiated by the data storage device 102, at block 302, the data storage device 102 obtains an index related to a group of data blocks, where the index includes multi-level nodes corresponding to a group of data blocks. A data block may be obtained using a node in the index.

In some embodiments, when a data backup operation is performed at the data storage device 102, an index related to all data for the backup operation may be generated. Nodes of the index may be file names or directories, etc. In some embodiments, an index may be generated for any amount of backup data. These examples are merely for describing rather than limiting the scope of the present disclosure. Those skilled in the art may set a relation between an index and backup data according to needs.

At block 304, a node identifier set of a plurality of nodes in the index corresponding to a plurality of data blocks to be restored is determined, where a group of data blocks corresponding to the index includes the plurality of data blocks to be restored. During data restoration, node identifiers of the plurality of nodes in the index corresponding to data blocks to be restored are determined.

At block 306, it is determined, based on the index and the node identifier set, whether a group of child node identifiers in the node identifier set related to a group of child nodes of the plurality of nodes is to be replaced with a father node identifier of a father node of the group of child nodes.

A group of child nodes with a same father node is determined from the node identifier set. Then, it is determined, according to the index, whether a group of child node identifiers in the node identifier set is replaced with the father node identifier. By replacing the group of child node identifiers with the father node identifier, a group of streams for the group of child nodes from the backup server 104 may be replaced with one stream for the father node. A process regarding how to determine, based on the index and the node identifier set, whether to replace child node identifiers with a father node identifier will be described in detail with reference to FIGS. 4A and 4B.

At block 308, the data storage device 102 determines whether a first group of child node identifiers is replaced with the father node identifier. If it is determined that the first group of child node identifiers is replaced with the father node identifier, at block 310, a request for obtaining the plurality of data blocks is sent to the backup server 104 to obtain the plurality of data blocks from the backup server 104, where the request includes the father node identifier.

After receiving the request, the backup server 104 will send a stream for the father node, rather than generating one stream for each of the data blocks that will be restored. With the above method, the number of streams sent by the backup server can be reduced. Thus, the time cost for retrieving data of a node, validating its existence and a size for each node is reduced, and further the use of resources of the backend backup server is reduced.

Figure 4A:
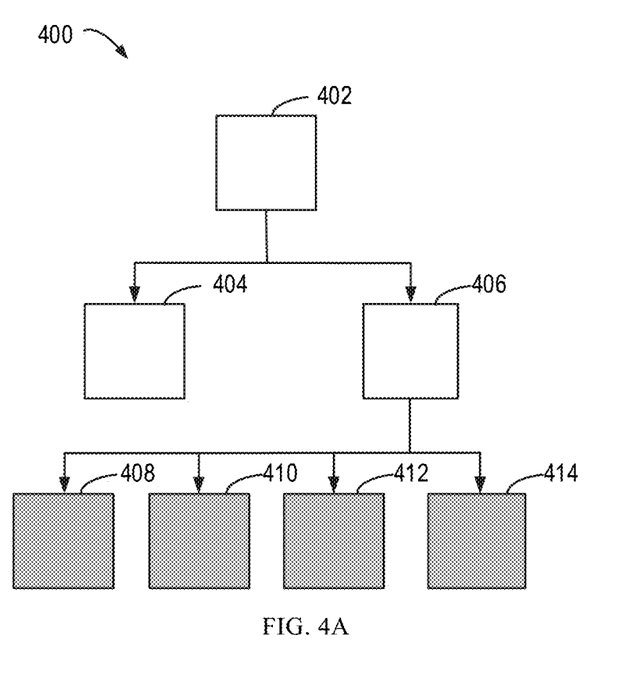
FIGS. 4A and 4B each show a schematic view of an example 400 of an index related to backup data blocks according to embodiments of the present disclosure.
Figure 4B:
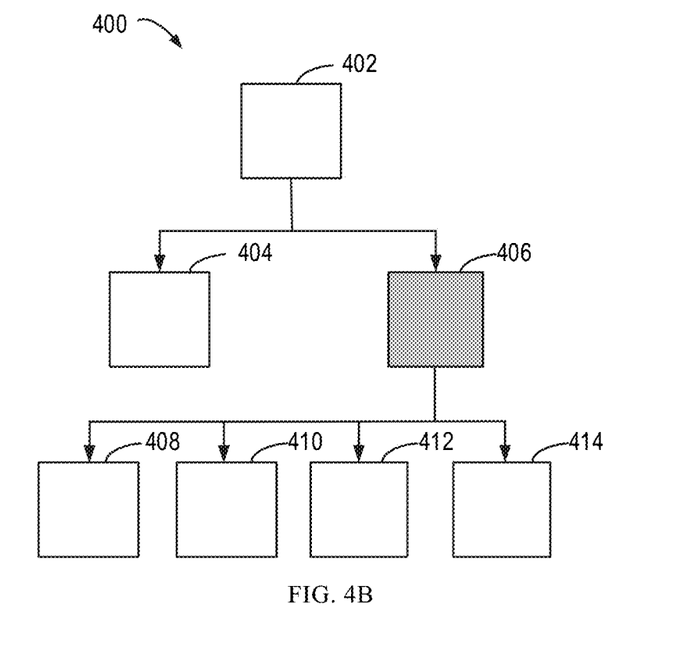

FIG. 3 has described the flowchart of the method 300 for restoring data according to embodiments of the present disclosure. With reference to FIGS. 4A and 4B, operations at block 306 will be described below.

As shown in FIG. 4A, the index related to backup data includes: a first-level node: a node 402; second-level nodes: nodes 404 and 406; third-level nodes: nodes 408, 410, 412 and 414. Nodes corresponding to to-be-restored data blocks are the nodes 408, 410, 412 and 414.

The data storage device 102 obtains the index and the node identifier set related to data blocks that will be restored. As shown in FIG. 4A, an index 400 and node identifiers of the nodes 408, 410, 412 and 414 corresponding to to-be-restored data blocks are obtained.

Then, the data storage device 102 determines the number of child nodes in a group of child nodes of the plurality of nodes corresponding to the plurality of to-be-restored data blocks. For the sake of description, the number of child nodes of a group of child nodes obtained from the identifier set is called a first number. In some embodiments, the data storage device 102 determines, based on identifier information of node identifiers, which node identifiers belong to a group, i.e., they have a same father node. Alternatively or additionally, whether node identifiers belong to a same group is determined by dividing paths indicative of node identifiers. These examples are merely for describing rather than limiting the scope of the present disclosure. Those skilled in the art may use any suitable means to determine the group of child nodes with the same father node.

In FIG. 4A, the nodes 408, 410, 412 and 414 corresponding to the to-be-restored data blocks form a group of child nodes, where the number of child nodes thereof is four.

Based on the determined group of child nodes, the father node thereof is determined. Then, the number of child nodes related to this father node is determined from the index. For the sake of description, the number of child nodes obtained from the index is called a second number. As shown in FIG. 4A, the father node 406 may be determined from identifier information corresponding to the nodes 408, 410, 412 and 414. Next, it is determined from the index 400 that the number of child nodes in the father node 406 is four.

It is determined, according to the first number and the second number, whether the first group of child node identifiers is replaced with the father node identifier. In some embodiments, a ratio of the first number of child nodes of the father node in the identifier set to the second number of child nodes of the father node in the index is determined. Then, it is determined whether the ratio exceeds a threshold; when the ratio exceeds the threshold, the first group of child node identifiers is replaced with the father node identifier. Alternatively or additionally, the threshold is set to 0.8. In some embodiments, a difference between the second and first numbers is determined, and then it is determined based on a size of the difference whether child node identifiers are replaced with the father node identifier. These examples are merely for describing rather than limiting the scope of the present disclosure, and those skilled in the art may determine whether the group of child node identifiers is replaced with the father node identifier, by using the first and second numbers and based on any suitable means.

As shown in FIG. 4A, the father node 406 of the nodes 408, 410, 412 and 414 related to to-be-restored data also has only four child nodes in the index. Therefore, as shown in FIG. 4B, node identifiers of the nodes 408, 410, 412 and 414 in the node identifier set are replaced with the father node identifier of the father node 406.

In the foregoing method, it is determined, from the first number of child nodes related to the father node in the identifier set and the second number of child nodes related to the father node in the index, child node identifiers are replaced with the father node identifier. As a result, not only received streams can be reduced, but also large amount of overhead generated during a replacing process can be prevented.

For the sake of description, the group of node identifiers related to the to-be-restored data blocks is called a first group of child node identifier below. In some embodiments, there further exists a node irrelevant to the to-be-restored data under the father node in the index. At this point, if the group of child node identifiers is replaced with the father node identifier, undesired data will be transferred back. Therefore, it is necessary to determine whether the father node in the index has a second group of child nodes other than the first group of child nodes. If there is the second group of child nodes, then a second group of child node identifiers related to the second group of child nodes is determined. Then, the second group of child node identifiers is added to the request sent to the backup server 104, to enable the backup server 104 not to transfer data blocks related to the second group of child node identifiers.

In some embodiments, after it is determined that the first group of child node identifiers in the node identifier set is replaced with the father node identifier, it may be further determined, with the above method, whether a group of new child nodes in the node identifier set is needed to be replaced with the father node identifier.

With the various embodiments according to the present disclosure, data of a group of child nodes are obtained with the father node identifier, without transferring data of child nodes that do not need to be restored. Thus, the amount of data transmission is reduced, time for data processing is also reduced, thereby improving efficiency of data processing.

The process of determining whether child node identifiers are replaced with the father node identifier has been described in conjunction with FIGS. 4A and 4B. Hereinafter, a flowchart of a method 500 of restoring data according to embodiments of the present disclosure will be described with reference to FIG. 5. This method is performed at the backup server 104 side.

Figure 5:
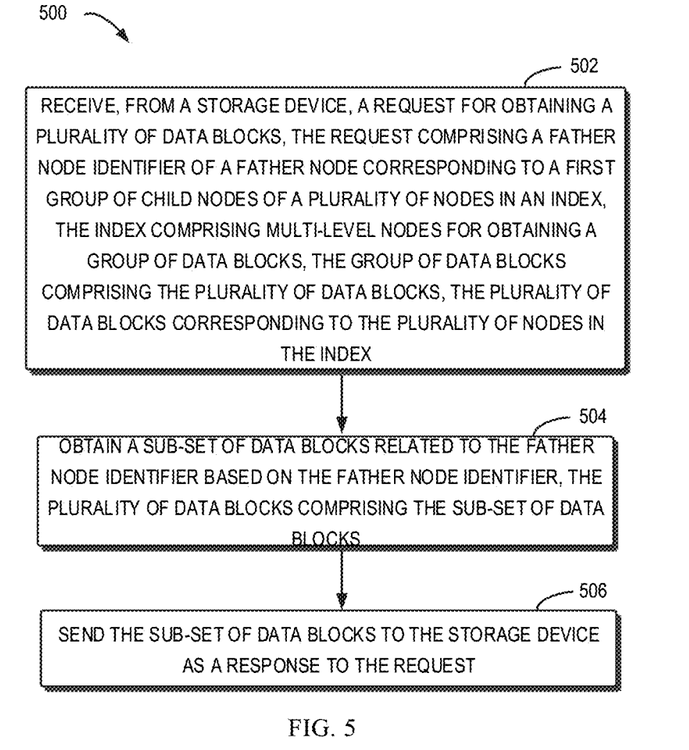
FIG. 5 shows a flowchart of a method 500 of restoring data according to embodiments of the present disclosure.

At block 502, the backup server 104 receives, from the data storage device 102, a request for obtaining a plurality of data blocks. In some embodiments, the request includes node identifiers corresponding to the plurality of data blocks to be restored. The node identifiers include a father node identifier of a father node corresponding to a first group of child nodes of a plurality of nodes in an index. Where, the index includes multi-level nodes for obtaining a group of data blocks which have been backed up in the backup server 104. The plurality of data blocks to be restored is data blocks in this group of data blocks. In addition, the plurality of data blocks to be restored corresponds to the plurality of nodes in the index. Alternatively or additionally, the request further includes an excluded node identifier related to the node identifiers for obtaining data.

At block 504, the backup server 104 obtains a sub-set of data blocks related to the received father node identifier based on the father node identifier. The plurality of data blocks to be obtained includes the sub-set of data blocks. The sub-set of data blocks is obtained from the backup server 104 based on the father node identifier.

In some embodiments, the request includes a father node identifier and without including a child node identifier indicative of an excluded child node related to the father node. Then, the sub-set of data blocks corresponding to the father node identifier is obtained. The sub-set of data blocks corresponding to the father node is sent via a stream for the father node identifier.

In some embodiments, the request further includes a second group of child node identifiers. The second group of child node identifiers corresponds to a second group of child nodes of the father node in the index, where the request indicates that data blocks related to the second group of child nodes are not transferred. The second group of child nodes is different from the first group of child nodes. Therefore, when obtaining the sub-set of data blocks corresponding to the father node identifier, data blocks related to the second group of child nodes are not obtained. Then, the obtained sub-set of data blocks is sent to the data storage device 102. These examples are merely for describing rather than limiting the scope of the present disclosure.

At block 506, the backup server 104 sends the sub-set of data blocks to the storage device as a response to the request. With respect to the received father node identifier, the backup server 104 forms a stream for the father node identifier to transfer the sub-set of data blocks corresponding to the father node identifier. Alternatively or additionally, transferred data blocks do not include a data block for an excluded child node of each node identifier. In some embodiments, a stream for transferring data blocks corresponding to further node identifiers is formed for further node identifiers in the identifier set in the received request. These examples are merely for describing rather than limiting the scope of the present disclosure.

By sending a stream corresponding to a father node identifier rather than a group of streams corresponding to a group of child nodes of the father node, the number of sent streams is reduced, resource utilization efficiency at the backup server is improved, and moreover the number of data verification occurrences is reduced.

Figure 6:
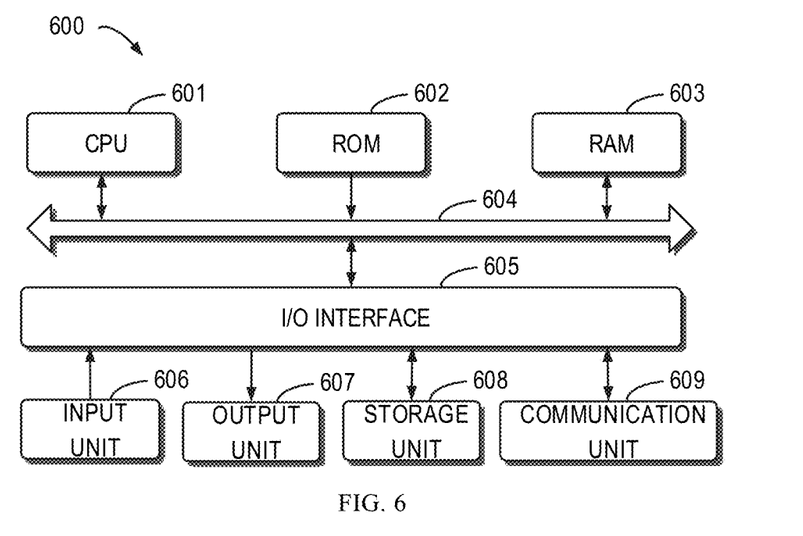
FIG. 6 shows a schematic block diagram of an example device 600 which is applicable to implement embodiments of the present disclosure.

FIG. 6 shows a schematic block diagram of an example device 600 suitable for implementing embodiments of the present disclosure. For example, any of 102 and 104 as shown in FIG. 1 may be implemented by the device 600. As shown, the device 600 comprises a central processing unit (CPU) 601 which is capable of performing various appropriate actions and processes in accordance with computer program instructions stored in a read only memory (ROM) 602 or computer program instructions loaded from a storage unit 608 to a random access memory (RAM) 603. In the RAM 603, there are also stored various programs and data required by the device 600 when operating. The CPU 601, ROM 602 and RAM 603 are connected to one another via a bus 604. An input/output (I/O) interface 605 is also connected to the bus 604.

A plurality of components in the device 600 are connected to the I/O interface 605: an input unit 606 including a keyboard, a mouse, or the like; an output unit 607, such as various types of displays, a loudspeaker or the like; a storage unit 608, such as a disk, an optical disk or the like; and a communication unit 609, such as a LAN card, a modem, a wireless communication transceiver or the like. The communication unit 609 allows the device 600 to exchange information/data with other device via a computer network, such as the Internet, and/or various telecommunication networks.

The above-described procedures and processes such as the methods 300 and 500 may be executed by the processing unit 601. For example, in some embodiments, the methods 300 and 500 may be implemented as a computer software program, which is tangibly embodied in a machine readable medium, e.g. the storage unit 608. In some embodiments, a part or an entirety of the computer program may be loaded to and/or installed on the device 600 via the ROM 602 and/or the communication unit 609. The computer program, when loaded to the RAM 603 and executed by the CPU 601, may execute one or more acts of the methods 300 and 500 as described above.

The present disclosure may be a method, a device, a system, and/or a computer program product. The computer program product may include a computer readable storage medium (or media) having computer readable program instructions thereon for causing a processor to perform aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored thereon includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

I claim:

1. A method of restoring data, comprising:
   obtaining an index related to a group of data blocks, the index comprising multi-level nodes for obtaining the group of data blocks;
   determining a node identifier set of a plurality of nodes in the index corresponding to a plurality of data blocks to be restored, the group of data blocks comprising the plurality of data blocks;
   determining, based on the index and the node identifier set, that a first group of child node identifiers, related to a first group of child nodes, is to be replaced with a father node identifier of a father node of the first group of child nodes, where the first group of child node identifiers is in the node identifier set, wherein determining that the first group of child node identifiers is to be replaced with a father node identifier further comprises:
      determining a first number of child nodes in the first group of child nodes and a second number of child nodes related to the father node in the index;
      and determining, based on the first number and the second number, that the first group of child node identifiers is to be replaced with the father node identifier;
   and in response to replacing the first group of child node identifiers with the father node identifier, sending, to a backup server, a request to obtain the plurality of data blocks from the backup server, the request comprising the father node identifier.

2. The method according to claim 1, wherein determining, based on the first number and the second number, that the first group of child node identifiers is to be replaced with the father node identifier comprises:
   determining a ratio of the first number to the second number;
   determining whether the ratio exceeds a threshold; and
   in response to the ratio exceeding the threshold, replacing the first group of child node identifiers with the father node identifier.

3. The method according to claim 1, wherein sending, to the backup server, the request to obtain the plurality of data blocks comprises:
   in response to replacing the first group of child node identifiers with the father node identifier, determining whether there is a second group of child nodes of the father node in the index, the second group of child nodes being different from the first group of child nodes;
   in response to determining that there is the second group of child nodes, determining a second group of child node identifiers related to the second group of child nodes;
   and adding the second group of child node identifiers to the request to enable the backup server not to transfer data blocks related to the second group of child node identifiers.

4. A computer program product being tangibly stored on a non-transitory computer readable storage medium and comprising machine executable instructions which, when executed, cause a machine to perform a method comprising:
   obtaining an index related to a group of data blocks, the index comprising multi-level nodes for obtaining the group of data blocks;
   determining a node identifier set of a plurality of nodes in the index corresponding to a plurality of data blocks to be restored, the group of data blocks comprising the plurality of data blocks;
   determining, based on the index and the node identifier set, that a first group of child node identifiers, related to a first group of child nodes of the plurality of nodes is to be replaced with a father node identifier of a father node of the first group of child nodes, where the first group of child node identifiers is in the node identifier set, wherein determining that the first group of child node identifiers is to be replaced with a father node identifier further comprises:
      determining a first number of child nodes in the first group of child nodes and a second number of child nodes related to the father node in the index;
      and determining, based on the first number and the second number, that the first group of child node identifiers is to be replaced with the father node identifier;
   and in response to replacing the first group of child node identifiers with the father node identifier, sending, to a backup server, a request to obtain the plurality of data blocks from the backup server, the request comprising the father node identifier.

5. The computer program product of claim 4, wherein determining, based on the first number and the second number, that the first group of child node identifiers is to be replaced with the father node identifier comprises:

determining a ratio of the first number to the second number;

determining whether the ratio exceeds a threshold;

and in response to the ratio exceeding the threshold, replacing the first group of child node identifiers with the father node identifier.

6. The computer program product of claim 4, wherein sending, to the backup server, the request to obtain the plurality of data blocks comprises:

in response to replacing the first group of child node identifiers with the father node identifier, determining whether there is a second group of child nodes of the father node in the index, the second group of child nodes being different from the first group of child nodes;

in response to determining that there is the second group of child nodes, determining a second group of child node identifiers related to the second group of child nodes;

and adding the second group of child node identifiers to the request to enable the backup server not to transfer data blocks related to the second group of child node identifiers.

* * * * *